May 30, 1961 T. G. FISHMEISTER 2,986,470
ACTIVATED CARRIER FOR DISPLAYING BIRTHDAY
CAKES AND OTHER EDIBLES
Filed Jan. 12, 1959 2 Sheets-Sheet 1
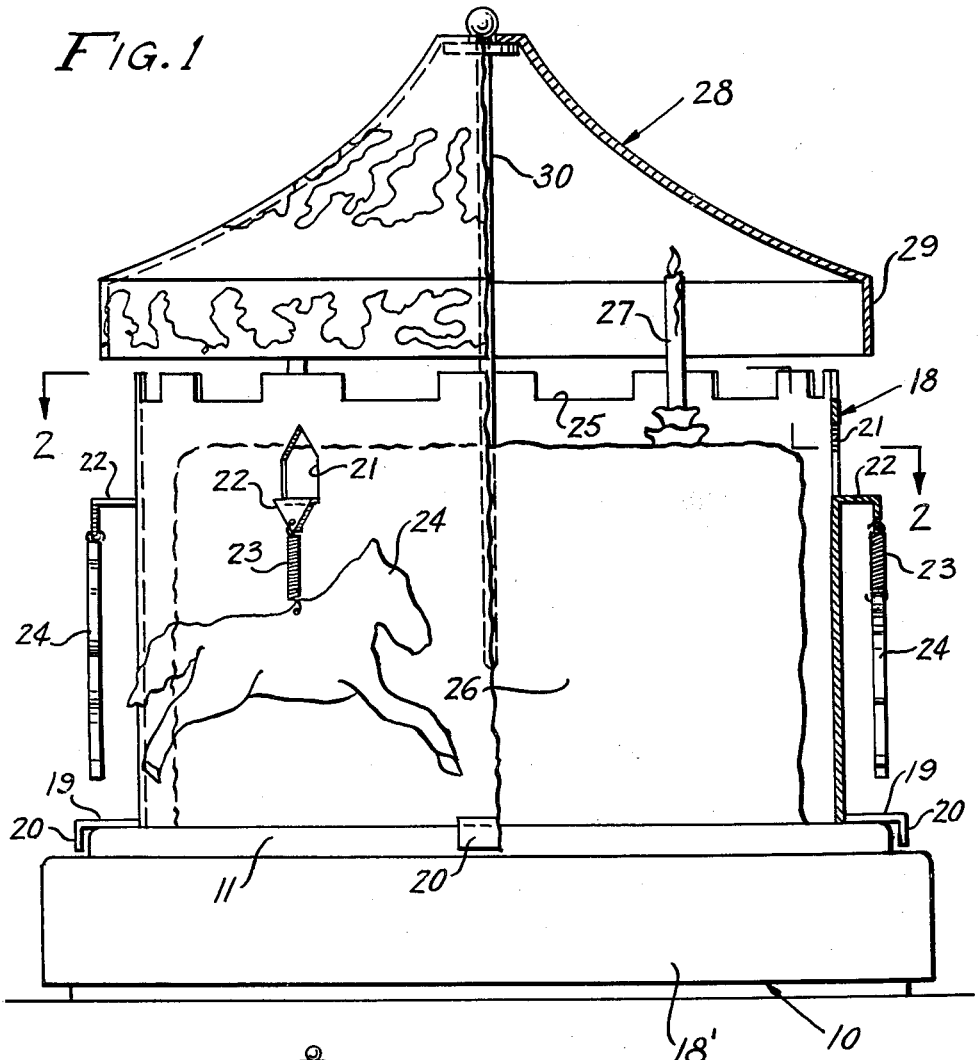
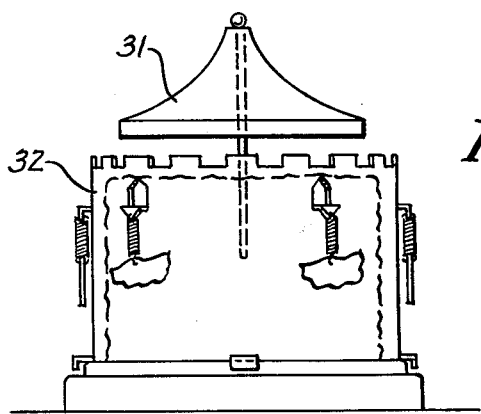
INVENTOR.
THELMA G. FISHMEISTER
BY
Atty.

INVENTOR.
THELMA G. FISHMEISTER

United States Patent Office 2,986,470
Patented May 30, 1961

2,986,470
ACTIVATED CARRIER FOR DISPLAYING BIRTHDAY CAKES AND OTHER EDIBLES

Thelma Green Fishmeister, Westport, N.Y.

Filed Jan. 12, 1959, Ser. No. 786,121

1 Claim. (Cl. 99—138)

This invention relates to improvements in display devices and more particularly an activated assembly for displaying such edibles as birthday cakes, especially at parties where the occassion is to be emphasized.

An important object of the invention is to provide a merry-go-round assembly adapted to be rotated and in which a cake, such as a birthday cake is positioned.

Another object of the invention is to provide a rotary assembly upon which a birthday cake can be displayed and which has internal mechanical means for playing musical pieces, such as "Happy Birthday To You."

A further object of the invention is to provide a rotary assembly, including a rotary platform upon which a cake or other edible may be placed, said edible being positioned within a wall structure, adapted to rotate with the cake and upon which eye-catching ornamental devices are arranged.

These and various other objects and advantages of the invention will become apparent to the reader of the following description.

In the drawings:

Figure 1 is a side elevational view of the assembly with a portion in section to disclose the cake, candles and the interior parts of the shell and canopy.

Figure 3 is a side elevational view of a slightly modified form of assembly, wherein the canopy is made somewhat less in diameter and the shell, to allow for more visibility of the cake, or other edible.

Figure 2:
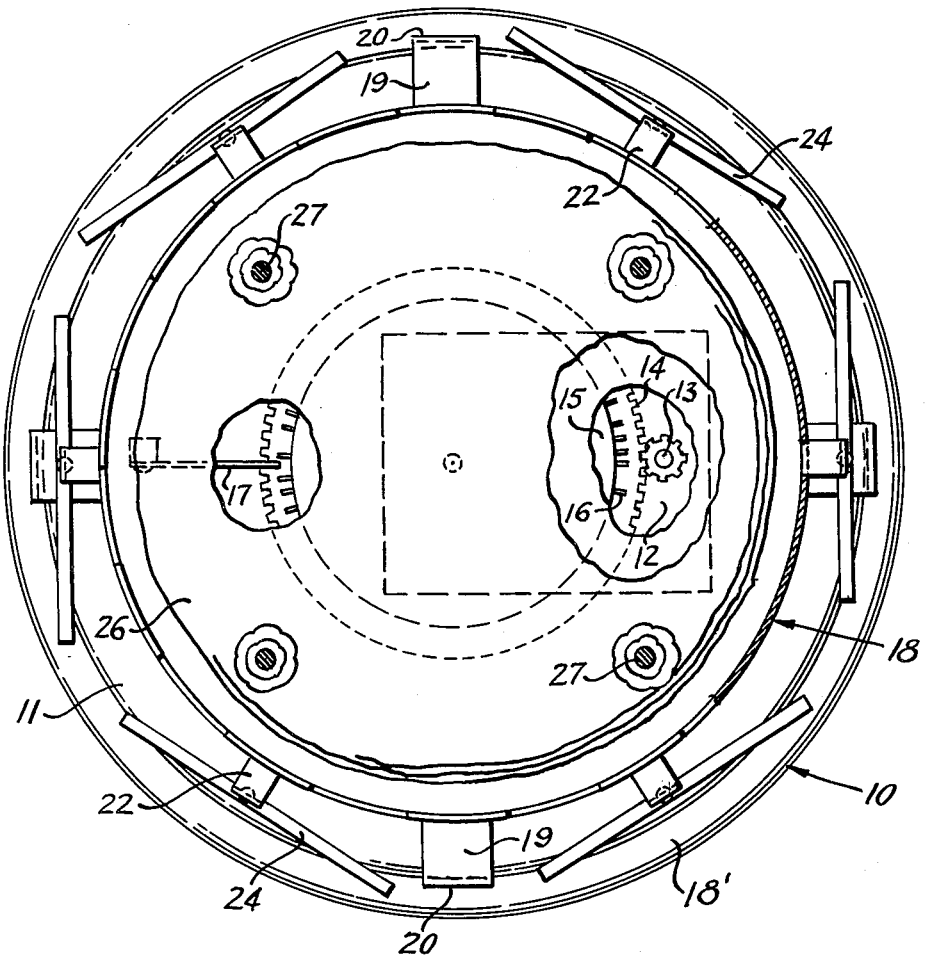
Figure 2 is a top plan view of the assembly without the cake and canopy and with parts broken away, to illustrate certain portions of the mechanical music box, or tune playing elements.

Referring to the drawings wherein like numerals designate like parts, it can be seen that the structure generally referred to by numeral 10 is of general conventional construction, it being a musical box of cylindrical shape and provided with internal mechanism, such as motive means 12 from which a drive shaft 13 extends to drive a large gear 14, which in turn drives a disc 15 having predeterminedly arranged lugs 16 thereon for engaging a musical reed 17. As stated, this is a conventional structure and the control for the motor 12 is not shown nor the power source whether it be spring or electric. This mechanism is located within the base structure 18 of said structure 10 and the table 11 projects slightly above the base 18, as shown in Figure 1.

Numeral 18 denotes a cylindrical wall or shell which may be transparent if desired and may be of any sheet material, including one of the plastics.

The lower portion of this shell 18 has outwardly disposed arms 19 for rest upon the edge portion of the rotary table 11 and each arm has a depending foot 20 to prevent any shifting of the shell 18 on the table 11.

The upper portion of the shell 18 is struck-out at equal spaced intervals, as at 21 to define outwardly and downwardly formed hangers 22, the lower portions of which are connected by tension springs 23 to figures such as those in the shape of horses 24. Of course other animal figure forms may be employed and the spring 23 is connected to the corresponding figure at a point where it will be suspended at its center point of gravity. It is preferable that the figures be of animals and that the entire structure having a carnival atmosphere, more than likely depicting a merry-go-round.

The upper edge of the shell 18 may be undulated or formed with rectangular shaped notches or openings 25.

As can be seen in Figure 1, a birthday cake 26 is placed on the rotary table 11, before the shell 18 is placed over the same, and of course the peripheral portion of the cake is normally in spaced relation to the shell and it is more than likely that birthday candles 27 will be provided on the cake.

Numeral 28 denotes a canopy of a general umbrella formation, the same having a depending circumferential flange 29 and extending downwardly from the uppermost portion of this canopy 28 is a vertical pin 30 which is disposed into the center of the cake 26, as suggested in Figure 1. Thus the canopy is supported. This canopy may be suitably embellished with designs or figures and is preferably of fireproof material, if the candles 27 are to be used.

It will be observed, that the apron or flange 29 depends to a position slightly spaced from the upper portion of the shell 18, so that varied beams of light can emanate through the notches 25 and be reflected downwardly from the outstanding flange 29, to adequately illuminate the outside of the shell 18 and the figures 24.

Figure 3 shows a slightly modified form of the invention, wherein a canopy 31 is provided for a wall or shell 32, corresponding to the shell 18, but the canopy 31 is somewhat smaller in diameter than the wall 18 for various reasons. It is possible to make this canopy considerably smaller so that the candles of the cake within the shell 32 will project upwardly outside of the apron of the canopy 31, and in fact, the canopy can have inscribed thereon the name of the person being celebrated, especially in the instance of a birthday party.

This assembly and its function will be highly attractive, especially to children and it can be manufactured very inexpensively and the musical box or base can be used for other purposes during the interval between party days.

As a matter of fact, the entire outfit can be rented for a party, thus making it unnecessary for a party giver to go to the expense of buying the entire assembly.

While no control has been shown for the musical box or base, these structures can be bought on the market and are usual spring wound. Of course with the turntable 11 of the base rotating, the cake and the shell 18, as well as the canopy 28 will rotate and will be highly attractive and amusing to children and even adults.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A device for displaying birthday cakes and the like comprising a turntable upon which a cake is placed, a removable transparent tubular shell positioned around said cake, radially disposed arms extending from the bottom of said shell engaging the periphery of said turntable, outwardly and downwardly extending hangers struck from said shell, a tension spring secured at one end to each hanger, an animal figure centrally suspended from the other end of each spring, musical means actuated by rotation of said turntable, a canopy positioned over said shell and spaced upwardly therefrom, and a central supporting pin for said canopy extending into said cake.

References Cited in the file of this patent

UNITED STATES PATENTS

| | | |
|---|---|---|
| D. 161,233 | Berkowitz | Dec. 19, 1950 |
| 243,781 | Koch | July 5, 1881 |
| 1,167,502 | Huffman et al. | Jan. 11, 1916 |
| 1,417,060 | Hansley | May 23, 1922 |
| 1,873,916 | Allabough | Aug. 23, 1932 |
| 2,194,238 | Weaver | Mar. 19, 1940 |
| 2,569,922 | Centofanti | Oct. 2, 1951 |
| 2,698,598 | Hadley | Jan. 4, 1955 |